United States Patent Office 3,493,327
Patented Feb. 3, 1970

3,493,327
REMOVAL OF IRON FROM DOMESTIC
BAUXITE LIQUOR
George Windham Cook, Benton, Ark., assignor to Reynolds Metals Company, Richmond, Va., a corporation of Delaware
No Drawing. Filed Oct. 12, 1967, Ser. No. 674,736
Int. Cl. C01f 1/00
U.S. Cl. 23—52                                        6 Claims

ABSTRACT OF THE DISCLOSURE

The iron content, and particularly the ferrous iron content, of alkali aluminate liquors derived from the extraction of domestic bauxite ores, is substantially completely removed by treatment of the aluminate liquor with a red mud or alkali insoluble residue derived from the digestion of Caribbean aluminous ores, such as Jamaican or Haitian bauxites.

BACKGROUND OF THE INVENTION

The invention relates to a novel method for the removal of iron from alkali metal aluminate solutions, particularly aluminate solutions obtained by the processing of aluminous ores available in the United States.

The most commonly used method for the extraction of alumina from bauxite is the Bayer process. In accordance with this process, the ground bauxite is digested with an aqueous solution of an alkali, such as, for example, caustic soda, or with a mixture of caustic soda and sodium carbonate. There is obtained a slurry which comprises a suspension of the constituents of bauxite other than alumina and which are insoluble in the alkali liquor. The liquor contains the alumina dissolved in the form of a supersaturated solution of sodium aluminate. The constituents of the bauxite which remain unattacked during the alkali digestion form an insoluble residue, known as red mud. The red mud is separated from the sodium aluminate solution or Bayer liquor by filtration or sedimentation or a combination of both. The clarified liquor comprises an unstable solution of alumina from which part of the dissolved alumina is precipitated by seeding with alumina hydrate. The precipitated alumina hydrate is then separated from the liquor by sedimentation and filtration, washed, and calcined at high temperatures to form alumina.

Purity specifications for alumina, and particularly for alumina of ceramic grade, limit the ferric oxide ($Fe_2O_3$) content to 0.30%. Concentrations of iron in excess of this limit tend to discolor the fused ceramic product, which is unacceptable. In order to meet this specification, it is necessary for the alkali aluminate liquor from which the alumina is produced to have a maximum iron content of no more than 3 parts per million.

The alkali aluminate liquors obtained in the extraction of domestic U.S. aluminous ores, such as, for example, Arkansas bauxites, tend toward a high iron content. This iron enters the liquor during the digestion of the domestic ore. It is in the ferrous state and is either soluble in the liquor or is present as an extremely fine colloid which precipitates with the alumina hydrate. This portion of the iron in the domestic ore is not removed with the domestic ore red mud, but passes through to the aluminate liquor. Various additives, such as oxidizing agents, have been proposed for the removal of the domestic liquor iron content, but these have all been unsatisfactory.

Caribbean bauxites have come into increased use in the American aluminum industry, including Jamaican and Haitian bauxites, which are characterized by a low silica and a high ferric oxide content. Their low silica content makes them attractive for Bayer processing since this minimizes loss of alumina and soda by formation of a complex sodium silico-aluminate. Only traces of ferrous iron are present in these types of bauxite, and the ferric oxide itself offers little difficulty in the production of high grade alumina from these ores, since little of it passes through to the aluminate liquor produced therefrom.

SUMMARY OF THE INVENTION

In accordance with the present invention, it has been found, surprisingly and unexpectedly, that the red mud or alkali insoluble residue derived from the digestion of Caribbean aluminous ores, and particularly from Jamaican bauxite, is capable of removing most of the iron content of alkli aluminate liquor. Accordingly, the present invention provides a novel method for the removal of iron, and particularly ferrous iron, present in alkali aluminate liquors derived from the digestion of iron containing aluminous ores, such as U.S. domestic bauxites.

As used in the present specification and claims, the term alkali aluminate means an aluminate of an alkali metal, such as, for example, sodium, potassium, and lithium.

It had been proposed in U.S. Patent 1,137,860 (1915) to use red mud derived from the alkali extraction of domestic bauxite for the removal of silica from alkali aluminate liquor, but the domestic red mud, in contrast to the Jamaican red mud, is not capable of removing iron, a fact which is proved by the continuing presence of excess iron in the alkali aluminate liquor derived from domestic bauxites after separation of the domestic red mud therefrom. It was the removal of this excess iron which the present invention has succeeded in bringing about.

The Jamaican or Haitian red mud may be added to the iron containing alkali aluminate liquor to be treated either by admixing it directly, or alternatively, by admixing the alkali aluminate liquor with the discharge from a digester in which the Jamaican bauxite has been extracted with alkali. Such Jamaica digester discharge contains the Jamaican red mud in suspension, and would normally go to a settler for clarification and separation of the red mud.

The Caribbean ores from which the red mud employed in accordance with the invention is derived, such as, for example, the Jamaican and Haitian bauxites, are characterized by low silica and high ferric oxide content. This ferric oxide, only traces of ferrous iron being present, does not contaminate the alumina product. The iron-bearing minerals present in the Jamaican bauxite consist predominantly of goethite $Fe_2O_3.H_2O$, and hematite, while in the Haitian ore the predominant iron mineral is hematite. The $Fe_2O_3$ content of these bauxites averages around 20% to 21%. The ores themselves are in a high state of subdivision, so that they resemble a relatively high iron clay. This high state of subdivision also appears in the residual red muds from the extraction of these bauxites, and may offer an explanation of their ability to remove ferrous iron, possibly by adsorption.

The Jamaican and Haitian red muds have a higher $Fe_2O_3$ content (about 55%) than the domestic ore red muds, as well as a lower silica content and a much higher surface area, which is at its peak as the red mud leaves the ore digester.

The proportion of Jamaican or Haitian red mud employed for iron removal may vary within wide limits, but it is generally in the range of about 0.25 to about 2.5 percent by weight on a dry basis, of the alkali aluminate liquor treated. The red mud is advantageously applied in the form of an aqueous slurry containing about 20% to 30% by weight of equivalent dry red mud.

The alkali aluminate liquor from domestic bauxites which is to be treated for iron removal is preferably one which has been freed from its domestic ore type red mud by previous settling. However, where the liquor still contains traces of domestic red mud in suspension, for example, about 300 parts per million, this does not appear to affect the iron removing action of the Jamaican or Haitian red mud added thereto. The alkali aluminate liquor, for example, the sodium aluminate liquor, is conventional in sodium aluminate concentration. It will typically contain about 190 g./kg. total soda and 135 g./kg. free soda. The total soda content is defined as the total of free NaOH and $Na_2CO_3$ present expressed as $Na_2CO_3$. The free soda is defined as the total free NaOH expressed as $Na_2CO_3$. It will typically possess an alumina/free soda ratio of 0.65, the ratio unit being defined as the ratio of alumina present expressed as grams per kilogram $Al_2O_3$, and the free soda as caustic soda, expressed as $Na_2CO_3$. It will be understood that the total soda content, free soda content and the alumina/free soda ratio may, however, vary considerably, depending upon plant practice. Conventional starch loadings may be employed to facilitate red mud flocculation.

The iron content of the domestic alkali aluminate liquor may run as high as 15 to 17 parts per million, expressed as $Fe_2O_3$. By the method of the invention this iron content may be successfully reduced to as little as 2 to 3 parts per million, representing iron removal up to 66% and higher.

The ordinary processing of domestic bauxite ores includes a subsequent lime-soda sintering step to convert the domestic red mud to sodium aluminate, which is leached out and returned to the ore extraction system. The use of this sintering step precludes any blending of the domestic and Caribbean bauxites in a single alkali extraction step, because in the high ferric iron content of the Caribbean red mud there is the possibility of the formation of a complex sodium ferroaluminate, rendering insoluble the alumina which the sintering step seeks to recover. This is one reason why the method of the invention preferably adds the Jamaican or Haitian red mud material to the domestic alkali aluminate liquor after removal of the domestic red mud.

The treatment temperature is between about 100° F. and about 220° F., preferably about 215° F.

DESCRIPTION OF THE PREFERRED EMBODIMENTS

Example 1

A domestic bauxite sodium aluminate liquor representing clarified overflow from the domestic red mud settlers, containing 130 g./kg. free soda, and having an $Al_2O_3$/free soda ratio of 0.60 and containing 12.3 p.p.m. iron expressed as $Fe_2O_3$, was mixed with the discharge slurry from the digestion of a Jamaican bauxite containing 30 grams per liter of Jamaican red mud and 2.1 p.p.m. $Fe_2O_3$, in the proportion of 1 part of Jamaican digester discharge to 3 parts of domestic settler liquor, by volume. The mixture was then settled at 190° F. Samples were taken and centrifuged for 5 minutes at 1000 r.p.m. to obtain clear solutions for iron analysis. The iron content of the treated domestic liquor was reduced to 3.2 p.p.m., a reduction of 66%.

Example 2

A domestic sodium aluminate settler overflow liquor of the type described in Example 1, but containing 11.1 p.p.m. of iron expressed as $Fe_2O_3$, was treated with varying proportions of 30% Jamaican bauxite digester discharge. The effect on iron removal is shown in the following table:

TABLE 1

| Percent Jamaican digester discharge | Percent domestic settler overflow | $Fe_2O_3$ in treated liquor (p.p.m.) | $Fe_2O_3$ removal percent of total |
|---|---|---|---|
| 0 | 100 | 11.1 | |
| 5 | 95 | 6.3 | 41 |
| 10 | 90 | 6.3 | 38 |
| 20 | 80 | 3.5 | 63 |
| 30 | 70 | 3.2 | 62 |
| 100 | 0 | 1.9 | |

Example 3

The effect of treatment of domestic alkali aluminate settler feed liquor for iron removal by direct treatment with varying amounts of Jamaican red mud slurry from a Jamaican red mud washer underflow is shown in the following table. The slurry contained 23.8% by weight of Jamaican bauxite red mud:

TABLE 2

| Jamaican red mud slurry added (g./kg.) | 0 | 10 | 20 | 50 | 100 |
|---|---|---|---|---|---|
| Equivalent dry mud (g./kg.) | | 0 | 2.4 | 4.8 | 11.9 | 23.8 |
| $Fe_2O_3$ in clarified liquor (p.p.m.) | 16.9 | 11.1 | 7.2 | 5.1 | 2.3 |

What is claimed is:

1. Method for the removal of iron from iron-containing alkali aluminate liquors in which the iron content is predominantly ferrous iron obtained by the digestion of iron-containing aluminous ores comprising admixing with the alkali aluminate liquor the ferruginous alkali insoluble red mud derived from the alkali digestion of Caribbean aluminous ores characterized by an iron content which is predominantly in the form of ferric oxide, the proportion of red mud being between about 0.25% and about 2.5% by weight of the alkali aluminate liquor treated on a dry basis, at a treatment temperature between about 100° F. and about 220° F., and separating the red mud together with the ferrous iron collected and removed by the red mud from the treated liquor.

2. The method of claim 1 in which the iron-containing aluminous ore is Arkansas bauxite.

3. The method of claim 1 in which the Caribbean aluminous ore is Jamaican bauxite.

4. The method of claim 1 in which the Caribbean aluminous ore is Haitian bauxite.

5. The method of claim 1 in which the red mud is supplied to the alkali aluminate liquor in the form of an aqueous slurry containing about 20% to about 30% by weight of equivalent dry red mud.

6. The method of claim 1 in which the red mud is supplied to the alkali aluminate liquor in the form of the discharge from the alkali digestion of the Caribbean aluminous ore.

References Cited

UNITED STATES PATENTS

| 938,432 | 10/1909 | Peffer | 23—143 |
| 1,137,860 | 5/1915 | Howard | 23—143 |
| 3,002,809 | 10/1961 | Walker | 23—52 |

HERBERT T. CARTER, Primary Examiner

U.S. Cl. X.R.

23—143